US012591264B2

(12) United States Patent
Davis et al.

(10) Patent No.: US 12,591,264 B2
(45) Date of Patent: Mar. 31, 2026

(54) DETACHABLE MULTI FUNCTIONAL CONTROL KNOB ASSEMBLY

(71) Applicant: Impulse Labs, Inc., San Francisco, CA (US)

(72) Inventors: Jacob Russell Davis, San Francisco, CA (US); Samuel Redmond D'Amico, San Francisco, CA (US); Samuel William Lenius, Palo Alto, CA (US); Bradley James Tallon, Los Angeles, CA (US)

(73) Assignee: Impulse Labs, Inc., San Francisco, CA (US)

( * ) Notice: Subject to any disclaimer, the term of this patent is extended or adjusted under 35 U.S.C. 154(b) by 0 days.

(21) Appl. No.: 19/011,044

(22) Filed: Jan. 6, 2025

(65) Prior Publication Data

US 2025/0224755 A1 Jul. 10, 2025

Related U.S. Application Data

(60) Provisional application No. 63/618,209, filed on Jan. 5, 2024.

(51) Int. Cl.
*G05G 1/10* (2006.01)
*G05G 1/12* (2006.01)

(52) U.S. Cl.
CPC .................................... *G05G 1/12* (2013.01)

(58) Field of Classification Search
CPC ............... G05G 1/08; G05G 1/10; G05G 1/12
See application file for complete search history.

(56) References Cited

U.S. PATENT DOCUMENTS 3,711,672 A * 1/1973 Moreland ............... F24C 7/083 219/625
8,217,742 B2 * 7/2012 Trudeau ................... G05G 1/10 335/206
10,447,262 B2 * 10/2019 Bach ....................... H03K 17/97
10,788,901 B2 * 9/2020 Olsson .................. G06F 3/0346
11,371,714 B2 * 6/2022 Lee .......................... F24C 3/126
2002/0057152 A1 * 5/2002 Elferich ................. B60K 35/10 335/220

FOREIGN PATENT DOCUMENTS

CN 204740526 U * 11/2015
CN 207851664 U * 9/2018
(Continued)

OTHER PUBLICATIONS

WO Application No. PCT/US2025/010455, filed by Impulse Labs, Inc.; International Search Report and Written Opinion dated Feb. 26, 2025, 8 pages.

*Primary Examiner* — Adam D Rogers
(74) *Attorney, Agent, or Firm* — COOLEY LLP

(57) ABSTRACT

A knob assembly for a coupled appliance includes a base static part and an actionable cap part, where the base static part includes a substrate base, a bearing holder fixed to the substrate base, a sleeve bearing fixed to the bearing holder, and a set of coupling magnets disclosed between the bearing holder and the substrate; the actionable cap part includes a covering cap, a rotor shaft attached to the covering cap, and a control magnet fastened to the rotor shaft. The knob assembly is capable of detachably attaching to a surface of the coupled appliance.

20 Claims, 8 Drawing Sheets

(56) References Cited

FOREIGN PATENT DOCUMENTS

| | | | | | |
|---|---|---|---|---|---|
| CN | 110568904 | A | * | 12/2019 | ............... G05G 1/10 |
| CN | 210156311 | U | * | 3/2020 | |
| CN | 210742773 | U | * | 6/2020 | |
| CN | 111555745 | A | * | 8/2020 | ............. H03K 17/90 |
| DE | 19922638 | A1 | * | 11/2000 | ........... G01D 5/2451 |
| KR | 20200000085 | U | * | 1/2020 | ............. H01H 25/04 |
| KR | 20230053878 | A | * | 4/2023 | ............. H01H 13/14 |
| WO | WO-2025147711 | A1 | | 7/2025 | |

* cited by examiner

DETACHABLE MULTI FUNCTIONAL CONTROL KNOB ASSEMBLY

CROSS REFERENCE TO RELATED APPLICATION

This application claims the benefit of and priority to U.S. Provisional Patent Application No. 63/618,209 filed Jan. 5, 2024, the entire disclosure of which is hereby incorporated by reference in its entirety for all purposes.

TECHNICAL FIELD

The disclosure generally relates to appliance control. More specifically, the present disclosure relates to a detachable multifunctional magnetic control knob assembly for improved control of coupled household appliances.

BACKGROUND

Existing control knobs used in household appliances, such as induction cooktops, stoves, microwaves, and refrigerators, exhibit various limitations that hinder their performance and usability. One significant issue is their fixed attachment to the appliance, which complicates the cleaning process. Since these knobs are often permanently coupled to the device, dirt, grease, and debris can accumulate in hard-to-reach areas, making thorough cleaning challenging.

Another limitation lies in their functional design. Most control knobs are restricted to a single mode of operation, such as rotating to adjust the heat temperature of a stovetop. This lack of versatility means that users cannot perform additional functions, such as switching between cooking modes, setting timers, or adjusting other appliance features, directly from the knob. As modern appliances become increasingly multifunctional, the knobs' limited design fails to meet evolving user needs.

Additionally, safety concerns are a critical drawback. Existing control knobs often lack built-in safety mechanisms, such as child locks or safeguards to prevent accidental activation. Without these measures, there is an increased risk of misuse, unintentional changes to appliance settings, or potential hazards in households with children.

Accordingly, there is an unmet need for improved control knobs for easier cleaning, integrating multifunctional controls to enhance usability, and incorporating safety features to ensure secure operation. Such improvements would make these knobs more user-friendly, versatile, and safe for everyday use.

SUMMARY

To address the aforementioned shortcomings, a magnetic control knob assembly for appliances is provided. An example knob assembly for a coupled appliance includes a base static part and an actionable cap part, where the base static part includes a substrate base, a bearing holder fixed to the substrate base, a sleeve bearing fixed to the bearing holder, and a set of coupling magnets disclosed between the bearing holder and the substrate; the actionable cap part includes a covering cap, a rotor shaft attached to the covering cap, and a control magnet fastened to the rotor shaft. The knob assembly is capable of detachably attaching to a surface of the coupled appliance.

The foregoing is a summary and thus contains, by necessity, simplifications, generalizations and omissions of detail; consequently, the summary is illustrative only and is not limiting in any way. Other aspects, inventive features, and advantages of the systems and/or processes described herein will become apparent in the non-limiting detailed description set forth herein.

BRIEF DESCRIPTION OF THE DRAWINGS

The disclosed implementations have advantages and features that will be more readily apparent from the detailed description, the appended claims, and the accompanying figures (or drawings). A brief introduction of the figures is below.

DETAILED DESCRIPTION

Figure 1:
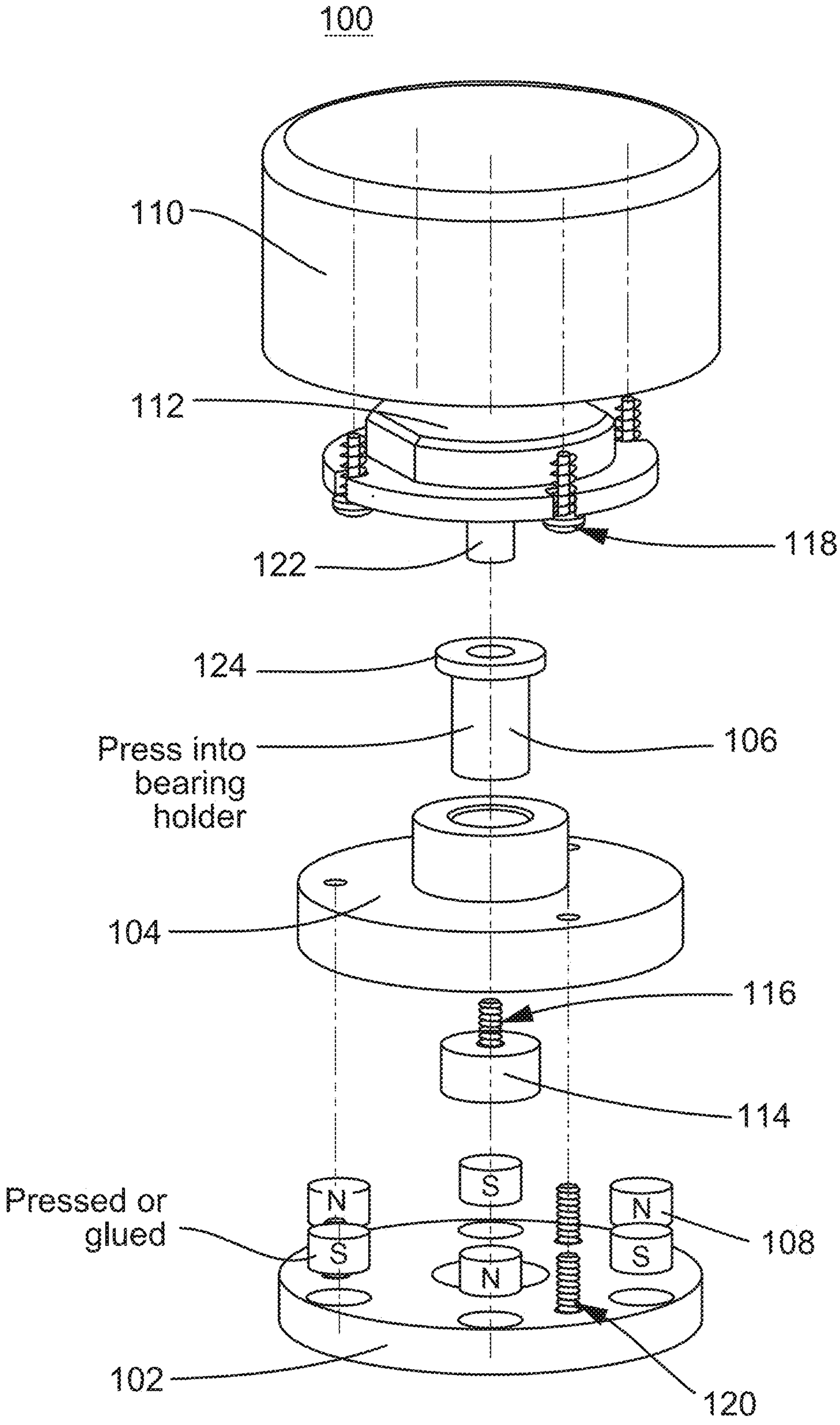
FIG. 1 is an exploded view of an example magnetic control knob assembly, according to some embodiments of the disclosure.

In the following detailed description of implementations, reference is made to the accompanying drawings which form a part hereof, and which are shown by way of illustrations. It is to be understood that features of various described implementations may be combined, other implementations may be utilized, and structural changes may be made without departing from the spirit and scope of the present disclosure. It is also to be understood that features of the various implementations and examples herein can be combined, exchanged, or removed without departing from the spirit and scope of the present disclosure. In addition, reference numerals and descriptions of redundant elements between figures may be omitted for clarity.

The present disclosure aims at solving the aforementioned problems and other problems found in existing control knobs by providing a magnetic control knob assembly that is detachable and multifunctional. The disclosed magnetic control knob assembly may be attached to a controlling unit fixed to the respective appliance through magnetic attraction, which makes the disclosed knob assembly detachable and removable from the coupled appliance. The magnetic sensing unit may be configured to be separate or independent from the magnetic control knob assembly so that the knob assembly can be easily removed. For example, a magnetic sensor (e.g., an angle sensor) for sensing the rotation of the knob assembly can be disposed within the controlling unit fixed to the appliance (e.g., under a surface of the appliance), where the magnetic sensor can be used as a knob reader to read the controlling information provided by the knob assembly, e.g., rotation angle and the like.

According to one embodiment, the angle sensor may be a magnetometer configured to detect the rotation information or angular position of a coupled magnet disposed within the detachable magnetic control knob assembly.

According to some embodiments, the disclosed magnetic control knob assembly may additionally include a magnetic click mechanism that allows part of the magnetic control knob assembly to move upward/downward to achieve a click action. By enabling a click action, the disclosed magnetic control knob assembly may be configured to implement additional functions beyond the functions achieved through the rotation of the magnetic control knob assembly as other existing magnetic control knobs do. For example, while the rotation action of the disclosed magnetic control knob assembly may be configured to control the heat temperature of a stove, the click action included therein may be configured to turn on/off the coupled appliance, and/or turn on/off components such as the lamp or fan included in the coupled appliance.

In some embodiments, the disclosed magnetic control knob assembly may be configured to turn on/off the coupled appliance even without the use of the aforementioned click function. For example, the disclosed magnetic control knob assembly may automatically shut off the coupled appliance when detached from the appliance (e.g., when pulling away from the surface of a coupled appliance). Additionally or alternatively, the disclosed magnetic control knob assembly may automatically turn on the coupled appliance when attached to the coupled appliance. In such an application scenario, the disclosed magnetic control knob assembly may use the click action to achieve functions other than turning on/off the coupled appliance. For example, the click action may be configured to turn on/off a light, a fan, a self-cleaning process for the coupled appliance, to navigate through the coupled appliance's user interface, and the like. In some embodiments, the disclosed magnetic control knob assembly may achieve additional functions not described above.

The disclosed magnetic control knob assembly shows advantages when compared to other existing magnetic control knobs. For example, the disclosed magnetic control knob assembly may implement multiple functions instead of a single function as other control knobs do. In addition, the knob sensor or knob reader is separable from the knob assembly, which may make the magnetic control knob assembly powerless (or with minimized power consumption), thereby simplifying the construction and/or extending the life of the disclosed magnetic control knob assembly. Further, the disclosed magnetic control knob assembly may be more secure when compared to other existing magnetic control knobs. For example, when properly configured, the coupled appliance may automatically shut off if the magnetic control knob assembly is removed from the coupled appliance. This can ensure that the coupled appliance will not turn on accidentally, e.g., by accident clicking the knob during a cleaning process or by a child. Additional advantages or features may include, but are not limited to, an easier cleaning process for the coupled appliance due to the removal of the disclosed knob assembly.

It is to be noted that the features, benefits, and advantages described herein are not all-inclusive, and many additional features and advantages will be apparent to one of ordinary skill in the art in view of the figures and the following descriptions.

FIG. 1 is an exploded view of an example magnetic control knob assembly 100, according to some embodiments of the disclosure. As used herein, the term "control knob" is to be interpreted according to its broad and ordinary meanings and may refer to any form of rotary or clickable component used to adjust settings or functions on a device or appliance. The disclosed control knob may thus be widely employed in household appliances such as stoves, ovens, microwaves, and refrigerators, as well as in industrial equipment and consumer electronics.

According to some embodiments, the knob assembly (or simply "knob") disclosed herein may be configured to include two different parts, a static base part, and a rotatable/clickable cap part. The static base part may include a substrate base 102, a bearing holder 104, a sleeve bearing 106, and a set of coupling magnets 108, all of which may be assembled together to form the non-movable static part of the knob assembly 100. The rotatable/clickable cap part may include a covering member such as a covering cap 110, a rotatory member such as a rotor shaft 112, and a rotary magnet such as a control magnet 114, all of which may be assembled together to form the rotatable/clickable cap part of the knob assembly. As illustrated in FIG. 1, the knob assembly 100 may include various fixing or fastening mechanisms such as screws 116, 118, and 120 that hold different components together. It should be noted that there may be any number, shape and size of screws that can be used to fix or fasten different components included in the knob assembly 100.

The substrate base 102 may be a circular substrate or a substrate with another different shape, e.g., an elliptical shape, square shape, a polygon shape, or any other regular or irregular shape. According to some embodiments, the substrate base 102 may include a set of placeholders for holding a set of coupling magnets 108.

Figure 2A:
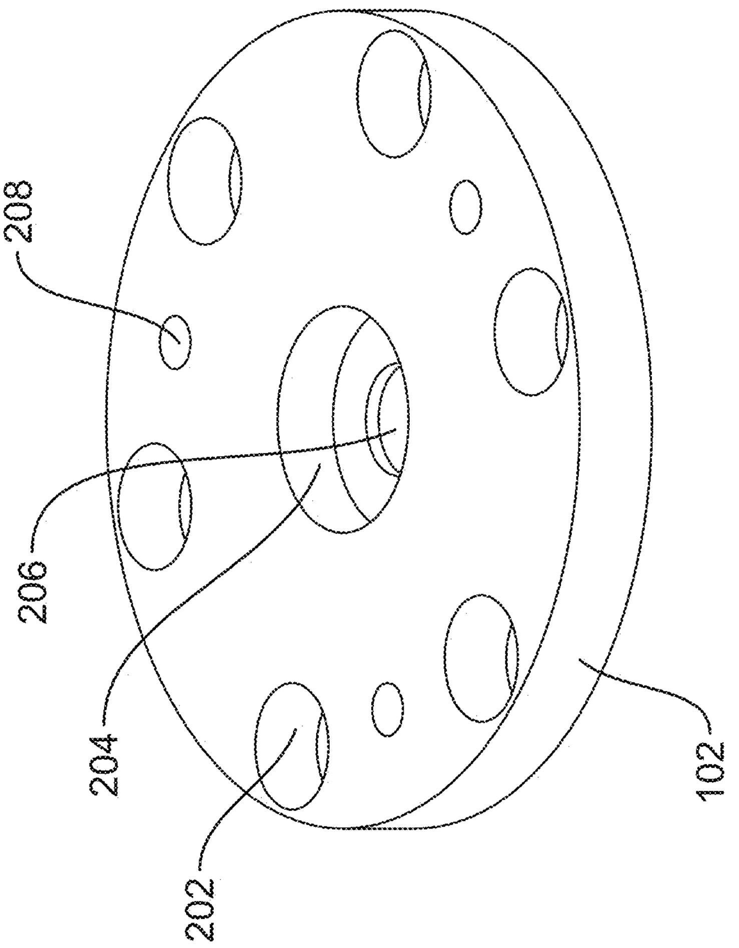
FIG. 2A illustrates an example substrate base with placeholders included therein, according to some embodiments of the disclosure.

An example substrate base with the placeholders included therein is illustrated in FIG. 2A, according to some embodiments of the disclosure. As illustrated in the figure, the substrate base 102 includes a set of placeholders 202 for holding the coupling magnets included in the knob assembly 100. These placeholders 202 may be evenly and radially distributed along the edge of the substrate base 102. In some embodiments, the number of placeholders 202 for the coupling magnets 108 may be 1, 2, 3, 4, 5, 6, or another different number, depending on the number of coupling magnets 108 configured for the magnetic control knob assembly. In addition, depending on the shape and size of the coupling magnets 108, the placeholders 202 for holding the coupling magnets 108 may also be the same shape or size or may have different shapes and sizes. In some embodiments, the shapes and sizes of the placeholders 202 for the coupling magnets 108 may match well with the shapes and sizes of the coupling magnets 108 so that these magnets will not move freely (e.g., move left, right, up, and down, or even rotate) once placed inside the placeholders 202.

In the illustrated embodiment in FIG. 2A, there are six placeholders 202 for holding the coupling magnets 108. These placeholders 202 are in the form of round recesses, which allows the coupling magnets 108 to mount inside these recesses, where the coupling magnets 108 may have the same round shape, but the diameter of the coupling magnets 108 is a little smaller than that of the placeholders 202, thereby allowing the coupling magnets 108 to fit into these round recesses well. In the illustrated embodiment in FIG. 2, the six placeholders 202 have the same size and shape. In actual applications, these placeholders may have different shapes and sizes. In addition, according to some embodiments, the distribution of these placeholders 202 may also vary but may not be necessarily evenly distributed in actual applications.

As also illustrated in FIG. 2A, according to some embodiments, the substrate base 102 also includes a central placeholder 204 for holding the control magnet 114. It is to be noted that, the central placeholder 204 configured for holding the control magnet 114 may have a size greater than the control magnet 114, which then allows the control magnet 114 to freely move, e.g., move up and down during a click action or rotate during a rotation action, as will be described more in detail later. In some embodiments, the central placeholder 204 is also in the form of a round recess, as can be seen from FIG. 2A. In addition, the central placeholder 204 may have a size or diameter greater than that of a coupling magnet placeholder 202.

Figure 3:
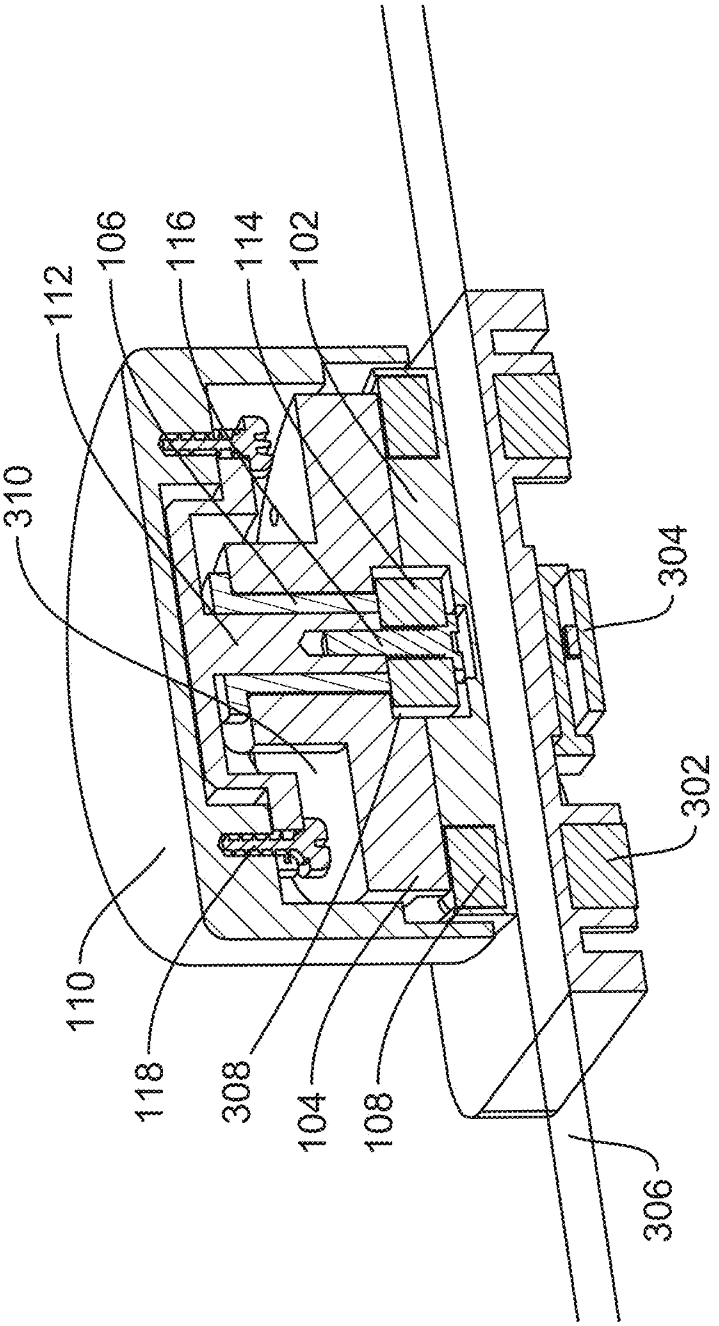
FIG. 3 is a cross section view of an example magnetic control knob assembly, according to some embodiments of the disclosure.

In some embodiments, at the bottom of the round recess of the central placeholder 204, there is an additional round recess 206. The depth and diameter of the additional round recess may be smaller than those of the central placeholder 204. The inclusion of the additional round recess 206 is to provide space for the rounded head of the thread-forming screw 116 for fixing the control magnet 114 to the rotor shaft 112, as can be seen in FIG. 3. For example, during the click actions of the knob assembly 100, when the control magnet 114 hits the bottom of the round recess of the central placeholder 204, the rounded head of the screw 116 may need additional space below the bottom of the round recess of the central placeholder 204, and thus the additional recess 206 is further provided. In some embodiments, the depth of the additional round recess 206 may be at least greater than the depth of the round head of the thread-forming screw 116. In some embodiments, there may be no additional recess 206 if the threaded hole in the rotor shaft 112 for receiving the screw 116 is configured to allow the round head of the screw 116 to flush with the bottom surface of the control magnet 114 or even deeper into the control magnet.

In some embodiments, the substrate base 102 further includes a set of screw holes 208 for fixing purposes, for example, for fixing the bearing holder 104 to the substrate base 102. In one example, these fixing holes 208 are threaded holes, each of which may be a cylindrical cavity with a helical ridge, or thread, winding around its inner wall. In general, these fixing holes 208 have a smaller diameter than the coupling magnet placeholder 202 and the central placeholder 204, however, the present disclosure is limited to such a configuration. The number of fixing holes 208 is also not limited to three as illustrated in FIG. 2A.

Figure 2B:
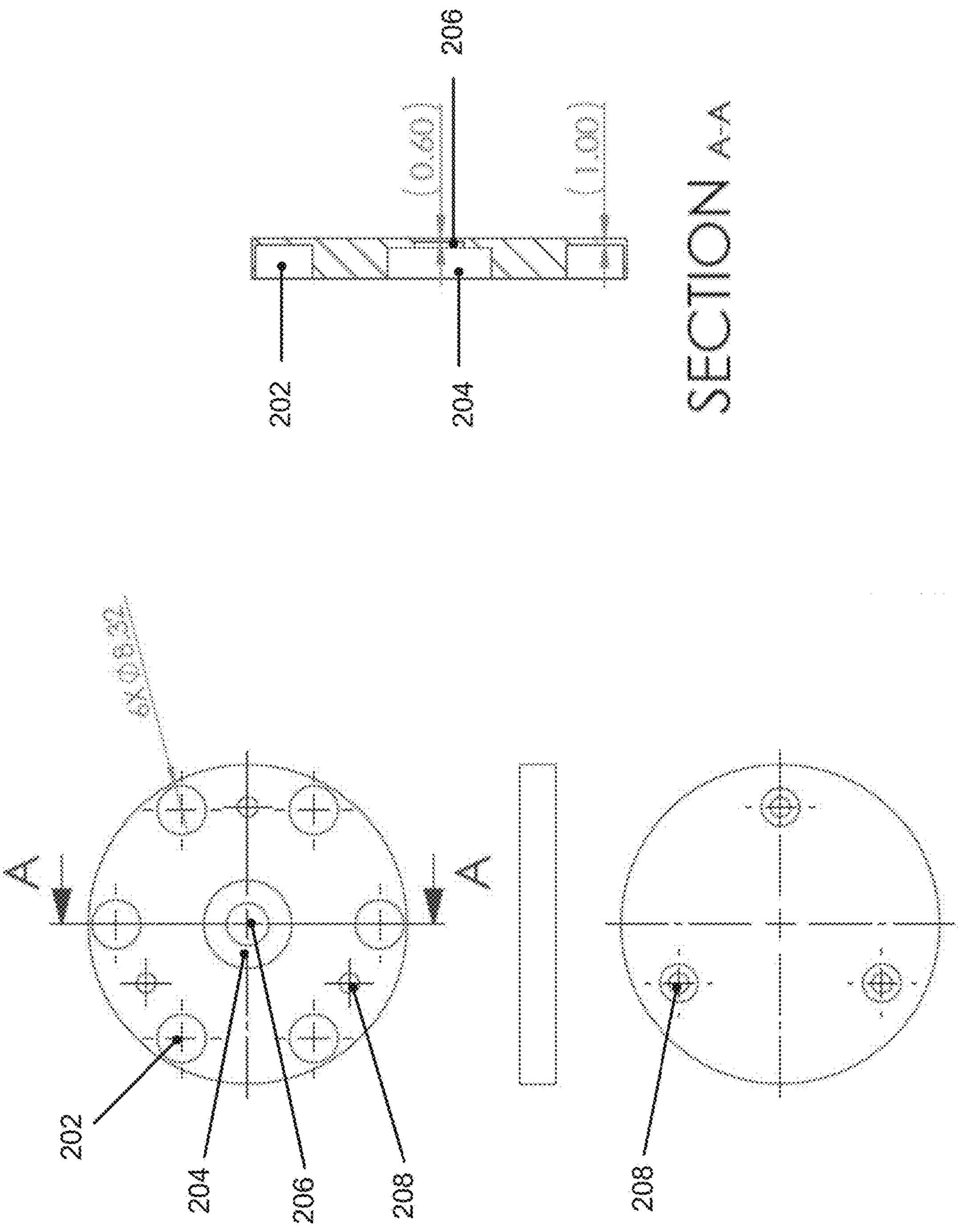
FIG. 2B illustrates an example layout of a substrate base, according to some embodiments of the disclosure.

Continue to refer to FIG. 2B, an example layout of the substrate base 102 is further illustrated, according to some embodiments of the disclosure. In the figure, the top left part and the bottom left part are the top view and bottom view of the substrate base 102, while the right part is the side view of the substrate base 102. In the illustrated embodiment, the depth of the additional round recess 208 is approximately 0.60 millimeters. The distance between the bottom of the coupling magnet placeholder 202 and the bottom of the substrate base 102 is 1.00 millimeters. It should be noted that these values are for illustrative purposes and not for limitation. For example, the depth of the additional round recess 206 can fall with a range of 0.4-1.2, 0.2-1.6, 0.2-2.0, 0.2-3.0 millimeters, or another different range. Similarly, the distance between the bottom of the coupling magnet placeholder 202 and the bottom of the substrate base 102 can fall in a range of 0.6-1.4, 0.5-1.5, 0.2-2.0, 0.2-3.0 millimeters, or another different range.

In addition, as can be seen from the bottom left part of FIG. 2B, the fixing holes 208 may pass through the bottom of the substrate base 102, where screws may pass through these fixing holes 208 from the bottom to fix the bearing holder 104, which may also include a corresponding set of fixing holes. It should be noted that, in some embodiments, the fixing holes 208 may not pass through the bottom of the substrate base 102. For example, the fixing screws may pass through these fixing holes from the bearing holder 104 side and thus do not need to reach the bottom of the substrate base 102. In this way, the bottom of the substrate base 102 may be a flat surface without any holes or recesses, which may be easier for cleaning the knob assembly 100. In addition, the possible frictions between the substrate base 102 and the surface of the coupled appliance caused by the holes or recesses on the bottom of the substrate base 102 may be avoided, thereby minimizing the scratches on the surface of coupled appliance caused by the knob assembly 100. In some embodiments, even if the fixing screws pass these fixing holes from the bottom of the substrate base 102, the heads of these screws may flush with the bottom surface of the substrate base 102 or even deeper into these fixing holes, which also minimizes the frictions between the substrate base 102 and the surface of the coupled appliance. In some embodiments, there are no fixing holes 208 for fixing purposes. Instead, the bearing holder 104 may be attached to the substrate base 102 through certain glue or other types of adhesives.

Referring back to FIG. 1, the coupling magnets 108 included in the knob assembly 100 may be configured to pair with another set of coupling magnets (e.g., coupling magnets 302 in FIG. 5) disposed within the coupled appliance (e.g., fixed under the surface of the coupled appliance) for detachably attaching the knob assembly 100 to the surface of the coupled appliance. According to some embodiments, the coupling magnets 108 may include any number of magnets in any shape, as long as these coupling magnets 108 allow the knob assembly to attach to the coupled appliance properly, e.g., at a desirable position and/or orientation. The placement, size, orientation, number, and material qualities of the magnets in the base 108 and within the appliance 302 may be selected or designed to facilitate proper orientation and retention of the knob assembly 100. If different appliances have different shapes, sizes and numbers of magnets, the coupling magnets 108 inside a knob assembly may also have different numbers, shapes, and/or sizes. The coupling magnets 108 and 302 may be selected or designed to withstand movement of the knob assembly 100 relative to the coupled appliance under normal usage conditions (e.g. when force is applied to the knob by a user in normal usage conditions or when the knob is to be placed on a non-horizontal surface). In the illustrated embodiment in FIG. 1, the coupling magnets 108 have a circular shape, and six coupling magnets are included in the knob assembly 100 in the illustrated embodiment in FIG. 1.

In some embodiments, when there is only one coupling magnet 108, the single coupling magnet 108 may be an annular magnet (with a central opening) aligned along the edge of the substrate base 102. In some embodiments, when there is more than one coupling magnet, the multiple coupling magnets 108 may be radially and symmetrically distributed (e.g., the centers of the coupling magnets 108 form a circle). In some embodiments, these multiple coupling magnets 108 may be disposed with alternating polarity alignment. Through the alternating polarity configuration, the stability and alignment with the coupling magnets 108 inside the coupled appliance can be enhanced. In one example, the upper parts of adjacent coupling magnets 108 may have opposite polarity, and the lower parts of adjacent coupling magnets also have opposite polarity, as illustrated in FIG. 1. In some embodiments, the number of coupling magnets 108 may be an even number so that the set of coupling magnets 108 have the alternating polarity between any adjacent coupling magnets 108. In some embodiments, the number, placement, and orientation of magnets may differ across knob assemblies 100 used in the same coupled appliance in order to facilitate proper knob placement on the appliance (e.g. when there are knobs for the operation of a burner and an oven on a range), where the knob assembly will only properly seat in its intended location on the appliance. In some embodiments, the number, placement, and orientation of magnets in the knob assemblies may facilitate proper clocking of the substrate base 102 such that the absolute position of the knob 110 relative to the coupled appliance may always be determined.

In some embodiments, neodymium or other similar magnets may be used in the disclosed knob assembly 100, to provide strong magnetic coupling, thereby ensuring the knob assembly 100 stays securely attached to the coupled appliance during operation.

In some embodiments, the coupling magnets 108 may be pressed into the corresponding placeholders 202 of the substrate base 102 with or without additional fastening mechanisms. In one example, the coupling magnets 108 may be fastened to the corresponding placeholders using a certain glue. In some embodiments, when the bearing holder 104 is fixed to the substrate base 102, e.g., through the screws or glue, the coupling magnets 108 may also be fastened sequentially. In some embodiments, the bearing holder 104 may also include certain placeholders for holding the magnets (not shown), similar to the placeholders 202 in the substrate base 102 described earlier. That is, the coupling magnets 108 may be partially held inside the substrate base 102 and partially held inside the bearing holder 104. In some embodiments, the coupling magnets 108 may be completely held inside the bearing holder 104 instead (not shown), or completely inside the substrate base 102 when the knob is assembled.

Referring now to the bearing holder 104, it may be configured to have a cylinder shape with an inner cavity (e.g., a central hollow portion) for housing the sleeve bearing 106 and for providing additional support for the coupling and control magnets. In some embodiments, to increase stability while minimizing the weight, the bearing holder 104 may include a central protruding portion that surrounds the central hollow portion for holding the sleeve bearing 106. The height of the protruding portion may match or may be a little smaller than the height of the sleeve bearing 106. In some embodiments, the bearing holder 104 may be fastened to the substrate base 102, e.g., through screws or glue as described above.

As described earlier, in some embodiments, the bearing holder 104 may include one or more placeholders for holding the coupling magnets 108 and/or the central control magnet 114. For example, as shown in FIG. 3, the bearing holder 104 may additionally include a recess 308 for holding the control magnet 114. The recess 308 may have a same shape and diameter as that of round recess 204 on the substrate base 102. The depth of the recess 308 in the bearing holder 104 may be the same or different from the recess 204 in the substrate base 102. In some embodiments, the recess 308 and the recess 204 together form a chamber for holding the control magnet 114, as well as for providing the space for the control magnet to rotate or move up and down in the chamber. Accordingly, the sum of the depths of the recess 308 and the recess 204 should be greater than the height of the control magnet 114, as can be seen from FIG. 3.

In some embodiments, the bearing holder 104 may have a same shape as the substrate base 102. For example, both the bearing holder 104 and the substrate base 102 may be round in shape. In some embodiments, the diameter of the bearing holder 104 and the substrate base 102 may be the same or may be different. In the illustrated embodiment in FIG. 3, the diameter of the bearing holder 104 is smaller than the diameter of the substrate base 102, which may decrease the weight of the bearing holder, and thus lower the cost of manufacturing the bearing holder 104 for the disclosed knob assembly 100.

Referring to the sleeve bearing 106, it may be configured to include a central hollow portion that holds an upward/downward moving section of the rotatable/clickable cap part. According to some embodiments, the sleeve bearing 106 may include different parts or layers configured to facilitate linear or rotational movements of the moving section of the rotatable/clickable cap part. For example, as illustrated in FIG. 1, the sleeve bearing 106 may be configured to hold a role or pole section 122 of the rotor shaft 112 to allow it to move upward/downward or rotate inside the sleeve bearing 106. In some embodiments, the sleeve bearing 106 may be fastened to the bearing holder 104 through certain fixing mechanisms, e.g., through glue or other different adhesives. In some embodiments, to prevent the sliding of the sleeve bearing 106 during a click action, the sleeve bearing 106 may additionally include a flange portion 124 radially expanding at the top of the sleeve bearing 106. The flange portion may be stopped by the protruding portion of the bearing holder 104 to control the downward motion of the sleeve bearing 106 to a limited distance during a click action.

In some embodiments, the part of the sleeve bearing 106 other than the flange portion 124 may have a height similar to that of the central hollow portion of the bearing holder 104. In this way, when the sleeve bearing 106 is fixed to the hearing holder 104, the bottom edge of the sleeve bearing 106 may flush with the bottom of the recess 308, as can be seen in FIG. 3.

In some embodiments, the sleeve bearing 106 is configured with low-friction properties, minimizing wear and ensuring effortless operation, even with frequent use.

In some embodiments, once assembled through certain fixing mechanisms, the substrate base 102, the coupling magnets 108, the bearing holder 104, and the sleeve bearing 106 may form the static part of the knob assembly. In some embodiments, before assembling the components 102, 104, 106, and 108 together, the control magnet 114 may be first fixed to the rotor shaft 112 from underneath the bearing holder 104 and then placed inside the corresponding placeholder 206 inside the substrate base 102, as can be seen from FIG. 3. Once the static part is assembled, the control magnet 114 should be able to move inside the chamber formed by the substrate base 102, the bearing holder 104, and the sleeve bearing 106.

Referring now to the rotatable/clickable cap part, as described earlier, the rotatable/clickable cap part may include a covering member such as a covering cap 110, a rotatory member such as a rotor shaft 112, and a rotary magnet or control magnet 114.

The covering cap 110 is a key component of the magnetic control knob assembly 100, functioning as the external covering and the part that users interact with. It covers the static base part and rotor shaft 112, providing a seamless external interface for users. For example, the covering cap 110 may extend to or over the static part to partially or completely cover the static part. This covering ensures that the internal components, such as the bearing holder 104 and the sleeve bearing 106, remain protected from external elements such as dust, moisture, or debris. The snug fit between the covering cap 110 and the static base part also enhances the knob's aesthetics by concealing mechanical parts.

In some embodiments, when the knob assembly 100 is clickable, the covering cap 110 may partially cover the static part (e.g., partially cover the substrate base) to leave the space or gap for pushing the rotatable/clickable cap part downward. For example, as shown in FIG. 3, there is a gap 310 between the covering cap 110 and the top surface of the bearing holder 104, which provides the space for the covering cap 110 to move downward.

In some embodiments, the covering cap 110 may have a shape that matches the shape of the substrate base 102 or may have another different shape. In some embodiments, the covering cap 110 may not be a uniform layer that has a consistent thickness. Instead, different parts of the covering cap 110 may have different thicknesses. In one example, the covering cap 110 may be molded to have an internal shape that matches the rotor shaft 112, to allow better fastening of the rotor shaft 112 to the inner surface of the top part of the covering cap 110, as can be seen from FIG. 3.

In some embodiments, the covering cap 110 is made of black acrylic, a durable and lightweight material that offers several advantages, including its durability, aesthetic finish, and ease of manufacturing. For example, acrylic can resist cracking, thereby providing structural stability under normal operational conditions. In addition, the black acrylic, combined with the polished surface, gives the knob assembly a sleek and modern appearance. The polished surface not only enhances usability by offering a smooth touch but also prevents dirt accumulation, simplifying cleaning and maintenance. Furthermore, acrylic is easy to mold and machine, making it suitable for precision components like the covering cap 110.

In some embodiments, the covering cap 110 is fastened to the rotor shaft 112, for example, using screws 118 or adhesive or similar fastening mechanisms. This connection ensures that any rotation or downward pressure applied to the covering cap 110 is directly transmitted to the rotor shaft 112. The precise alignment between the covering cap 110 and the rotor shaft 112 is critical for smooth motion and accurate sensor readings. For example, when the covering cap 110 is turned, the rotor shaft 112 rotates within the sleeve bearing 106. This motion drives the control magnet 114 at the bottom of the rotor shaft 112, which interacts with the appliance's sensors to adjust settings like temperature or time. In addition, when the covering cap 110 is pressed, it moves the rotor shaft 112 downward inside the sleeve bearing 106. The control magnet's position changes, triggering the appliance's click-action sensor to perform actions like turning the device on/off, turning the lamp/fan on/off, etc.

Figure 4:
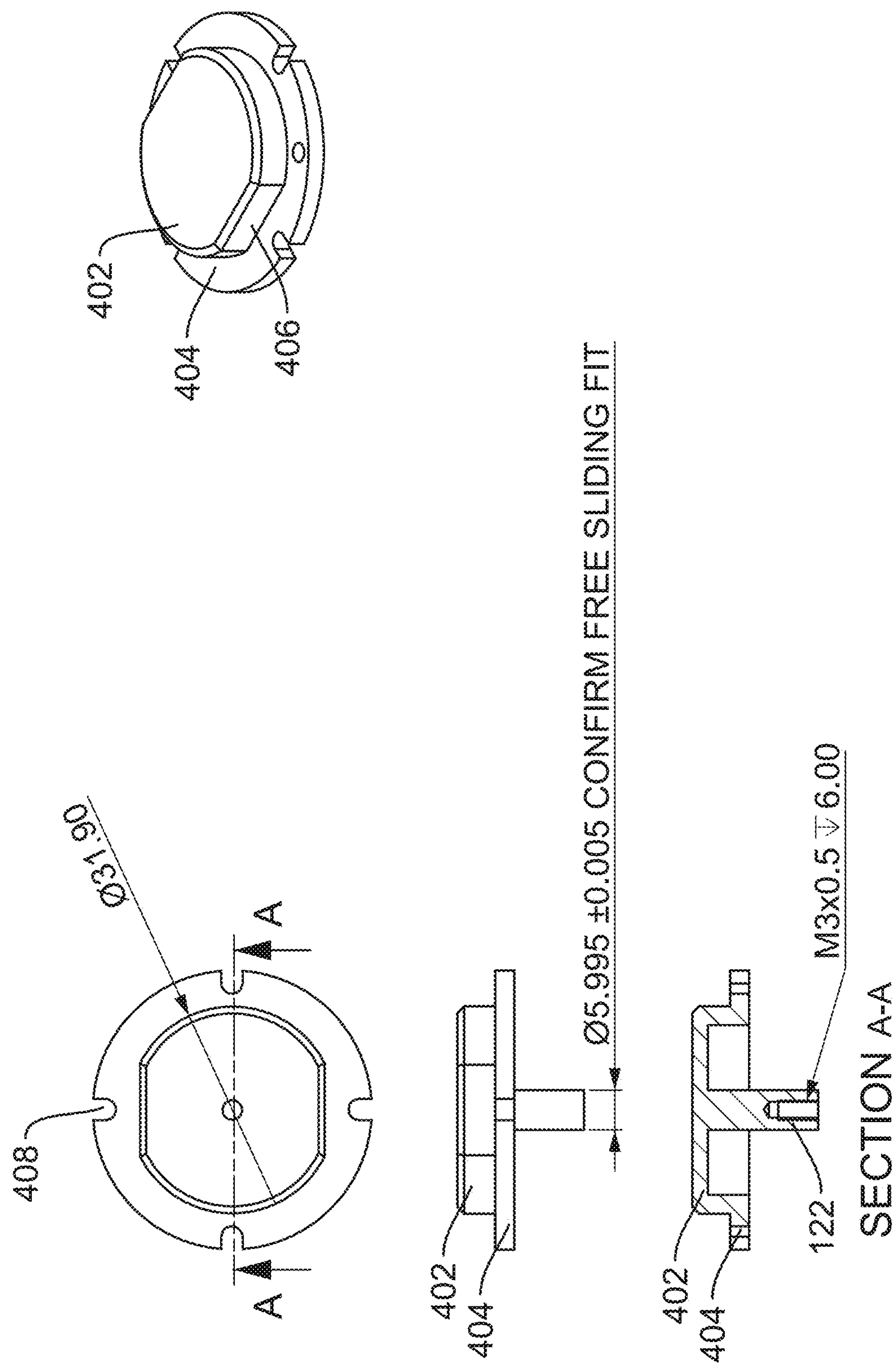
FIG. 4 illustrates an example layout of a rotor shaft, according to some embodiments of the disclosure.

Referring now to FIG. 4, the specific structure of the rotor shaft 112 is further described. As can be seen from the graphs shown in FIG. 4, the rotor shaft 112 may include an upper cap portion 402, a lower flange portion 404, a vertical neck portion 406 connecting the cap portion and the flange portion, and an underneath rod or pole 122 described earlier. The upper cap portion 402 may provide support for the rod or pole 122 as well as the flange portion 404, and may abut against the underneath of the cap 110 when being fixed by the screws 118 through the flange portion 404, as can be seen from FIG. 3.

Referring now to FIG. 4, the specific structure of the rotor shift 112 is further described. As can be seen from the graphs shown in FIG. 4, the rotor shift 112 may include an upper cap portion 402, a lower flange portion 404, a vertical neck portion 406 connecting the cap portion and the flange portion, and an underneath rod or pole 122 described earlier. The upper cap portion 402 may provide support for the rod or pole 122 as well as the flange portion 404, and may abut against the underneath of the cap 110 when being fixed by the screws 118 through the flange portion 404, as can be seen from FIG. 3.

As can be seen further seen from the right graph and the top left graph from FIG. 4, the upper cap portion 402 may be not a round cap, but rather has two cut sections or a central extension portion. This design may allow the rotor shaft 112 to rotate better when the cap rotates. For example, the internal surface of cap 110 may also include a recess that has a shape and size that matches the upper cap portion 402 of the rotor shaft 112.

The lower flange portion 404 has a set of notches 408 for holding the screws 118 used to fix the rotor shaft 112 to the cap 110 of the knob assembly 110, as can be seen in FIG. 3. The height of the neck portion 406 is designed to allow the screws to at least fit into the screw holes in the cap 110, but is not so large so that there is at least a gap 310 between the heads of the screws 118 and the top surface of the bearing holder 104, where the gap 310 has a space sufficient for the upward and downward movements during the click operations of the knob assembly 100, as can be seen from FIG. 3.

In some embodiments, the rod or pole 122 has a length that is greater than the length of the sleeve bearing 106, so that the rod and pole can move upward or downward inside the inner cavity of the sleeve bearing. In some embodiments, the bottom part of the rod or pole 122 includes a fixing pole for fastening the control magnet 114 to the rotor shaft 112.

Referring now to the control magnet 114, which may be fastened to the lower end of the rod or pole section 122 of the rotor shaft 112 through the screw 116, and may be configured to interact with sensors in the appliance to detect rotation or click actions of the knob assembly. According to some embodiments, by fixing the control magnet 114 to the rotor shaft 112, the control magnet 114 may be controlled to move linearly or rotationally when applying a force to the covering cap 110. For example, when pushing the covering cap 110, the rotor shaft 112 may drive the control magnet 114 to move closer to a magnetic sensor (e.g., magnetic sensor 304 in FIG. 5) disposed inside the coupled appliance. The changed distance may also cause the strength of the magnetic field formed between the control magnet 114 inside the knob assembly 110 and the coupled magnet inside the magnetic sensor disposed within the coupled appliance. The changed strength may be then detected by the sensor (e.g., a magnetometer), which may then allow the controlling unit of the appliance to generate a proper action, e.g., turn on or turn off the appliance.

Similarly, when applying a force to rotate the covering cap 110, the control magnet 114 may be also controlled to rotate accordingly, driven by the rotor shaft 112. The rotation of the control magnet 114 may also cause the rotation of the coupled magnet disposed inside the controlling unit of the coupled appliance. The rotation of the coupled magnet may be also detected by the sensor (e.g., a magnetometer) disposed inside the controlling unit of the appliance. In some embodiments, the sensor configured for rotation detection may be the same sensor configured for click action detection, or may be a different sensor specifically configured to detect the rotation action of the knob assembly. In some embodiments, a proper response may be also generated by the controlling unit of the appliance in response to the rotation action, which may include but is not limited to adjusting the heating temperature of a stove, the cooking time of a microwave, a heating power or level of a microwave, and so on. The specific functions and structures of different components included in the knob assembly are further described below with reference to FIGS. 3-6.

FIG. 3 illustrates a cross section view of an example magnetic control knob assembly 100, according to some embodiments. As illustrated in the figure, the set of coupling magnets 108 inside the knob assembly 100 are disposed within chambers formed by the substrate base 102 and the bearing holder 104, and held tight when the bearing holder 104 is fastened to the substrate base 102. When being placed onto an appliance (e.g., stovetop glass) at the desired location, the set of coupling magnets 108 may align well with the coupling magnets 302 disposed inside the appliance (e.g., under the stovetop glass 306 as illustrated in FIG. 3). In some embodiments, the alignment of the corresponding coupling magnets 108 between the knob assembly 100 and the coupled appliance may then place the control magnet 114 (e.g., magnet for angle sensing as illustrated in FIG. 3) at a location corresponding to a magnetic sensor (e.g., magnetic angle sensor 304 as illustrated in FIG. 3) disposed inside the appliance. It is to be noted that while not shown, in some embodiments, the appliance may include other sensors configured for other different functions, such as sensors for sensing click action as described earlier.

It is also to be noted that, in the illustrated embodiment in FIG. 3, the sleeve bearing 106 is constructed by using magnetic material. One purpose of using magnetic material to construct the sleeve bearing 106 is to enable the click action of the disclosed knob assembly 100. For example, the magnetic material included in the sleeve bearing 106 may have a magnetic polarity opposite to the polarity of the control magnet 114 (e.g., at certain parts of the control magnet) or sleeve bearing, and thus can attract the control magnet 114 to the bottom of the sleeve bearing 106 (i.e., the top of the chamber formed by the substrate base 102 and the bearing holder 104). The magnetic attraction may be overridden by a click action applied to the cap 110 that pushes the control magnet 114 away from the bottom of the sleeve bearing 106. In some embodiments, once the force applied to the cap is removed, the magnetic attraction between the magnetic material included in the sleeve bearing 106 and the control magnet 114 may automatically pull the cap upwards. In some embodiments, an audible clicking noise can be heard when the movement of the rotatable/clickable part of the knob assembly is blocked by the static part of the knob assembly.

Referring back to FIG. 3, in some embodiments, there is a certain gap 310 between the top surface of the bearing holder/sleeve bearing and the corresponding part(s) of the cap and/or rotor shaft. This provides space for the upward/downward movements of the cap 110 during a click action. Additional space is also configured for moving the control magnet upward and downward, as described earlier.

In real applications, the cap 110 can be pushed down at a limited distance (e.g., 0.5 mm, 1 mm, 1.5 mm, 2 mm, or another different value). The exact distance that the cap can be pushed down is limited by the gap between the cap/rotor shaft and the bearing holder/sleeve bearing, as can be seen in FIG. 3, and/or may be limited by the space configured for the control magnet movement inside the chamber as described earlier.

Figure 5:
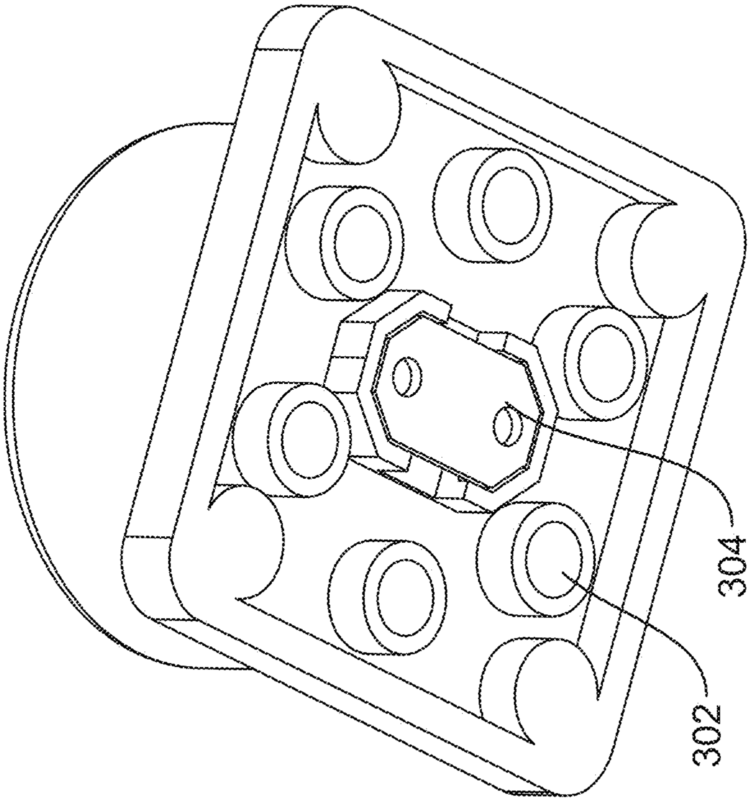
FIG. 5 is a bottom view of a portion of a coupled appliance, according to some embodiments of the disclosure.

FIG. 5 further illustrates a bottom view of a portion of a coupled appliance, according to some embodiments. As illustrated, the coupled appliance may include a magnetic sensor 304 under the surface of the appliance, which can be an angle sensor as illustrated in FIG. 5, or can be another different sensor, e.g., a sensor for detecting a click action. In some embodiments, the control magnet 114 included in the knob assembly 100 may be magnetized across its diameter so that the filed direction can be detected by the magnetic sensor (e.g., angle sensor illustrated in FIG. 5) under the surface of the coupled appliance (e.g., under a stovetop glass), similar to a compass.

As illustrated in FIG. 5, in some embodiments, the angle sensor, or another different sensor 304 included in the coupled appliance, may be coupled to a Printed Circuit Board Assembly (PCBA) that contains necessary electronic components for the board to function as needed in the angle detection and/or click action detection, among other possible functions. In some embodiments, the sensor may be a Hall effect sensor which can determine the strength and direction of the magnetic field and determine the rotational and vertical position of the knob 110 by determining the orientation and position of the attached magnet 102.

As also illustrated in FIG. 5, besides the sensor(s) 304, there is also a set of coupling magnets 302 disposed under the top surface of the coupled appliance. The set of coupling magnets 302 disclosed thereunder may facilitate the alignment of the knob assembly 100 when placing the knob assembly onto the coupled appliance. In one example, the coupled appliance may include a number of coupling magnets that have alternating polarity, similar to the coupling magnets included in the knob assembly. In addition, the polarity of the two corresponding coupling magnets within the substrate base and the coupled appliance is also different. For example, the upper part of a coupling magnet 302 is different from the lower part of the corresponding coupling magnet 108 once aligned.

Figure 6:
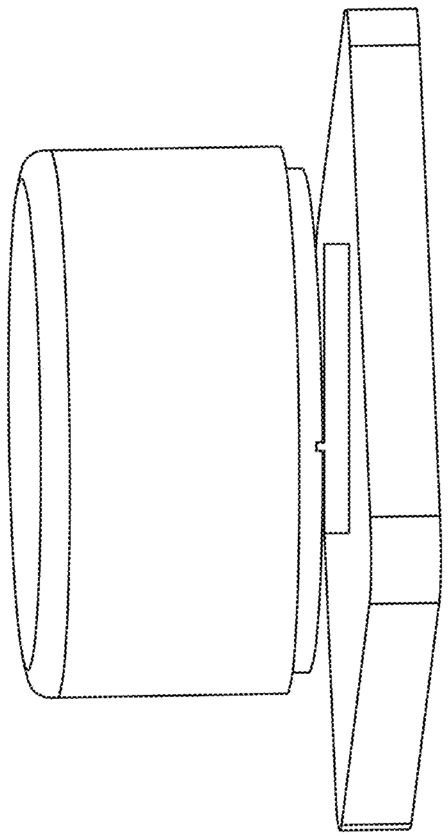
FIG. 6 is an overall view of an example magnetic control knob assembly, according to some embodiments of the disclosure.

FIG. 6 further illustrates an overall view of an example knob assembly 100 sitting on an appliance surface, according to some embodiments. As illustrated, the knob assembly 100 may have a round covering member, similar to the knob assembly in the illustrated embodiment in FIGS. 1-5. In addition, the bottom edge of the sidewall of the covering cap 110 of the knob assembly shown in FIG. 6 has a distance from the bottom surface of the substrate base 102 along the extension direction of the sidewall from the top of the covering cap towards the bottom edge, leaving space for the click action of the rotatable/clickable cap part of the knob assembly. As also illustrated in FIG. 6, the substrate base 102 is smaller than the covering member in the planar view, since the projection of the bottom edge of the covering cap 110 is greater than the projection of the substrate base 102 on an appliance surface when the knob assembly is placed onto the appliance surface.

It should to be noted that, the size and shape of the substrate base 102 and the size, shape, and height of the covering cap 110 illustrated in FIGS. 1-6 are merely for illustrative purposes but for limitations. In real application, there are many variations that can be configured for the covering cap and the substrate base.

It is also to be noted, while FIGS. 1-6 use a stovetop as an example application in the illustrated embodiments, the disclosed knob assembly 100 is not limited to such application. In one example, the disclosed knob assembly may be applied to a microwave oven for heating the food with electromagnetic waves. In this application scenario, a knob touching region (e.g., a desired location where the knob assembly is expected to be placed) for the microwave oven may include one or more magnetic sensors for sensing the click action or rotation action enabled for the disclosed knob assembly, which can then be used to adjust an operating time and/or heating strength of the coupled microwave oven. As another example, the disclosed knob assembly may be applied to a refrigerator for storing the food. In this application scenario, a knob touching region may be provided on a closed-type surface of the refrigerator, which can be used to adjust the cooling temperature or level for different freezing/frozen sections included in the refrigerator.

It should be further noted, while the knob assembly 100 is illustrated as being placed onto a flat horizontal surface of the oven top in the illustrated embodiments, in actual applications, the disclosed knob assembly 100 can be placed onto an included surface at any specific angle (e.g., a vertical surface for a microwave).

In addition, while there is no mark/label illustrated for the surface of the coupled appliance and the knob assembly 100, in real applications, there may be certain marks or labels on the knob assembly and/or the appliance surface, which allows the knob assembly to better align with the controlling unit under the surface of the coupled appliance, and/or allow the better operate the disclosed knob assembly (for example, temperature marks, heating level markers, etc.)

In some embodiments, for a single appliance, multiple knob assemblies 100 may be configured, where each knob assembly may be independently configured to implement the same or different functions. For example, for a stove that includes multiple burners, each burner may have a corresponding knob assembly 100. Alternatively, these multiple burners may share the same knob assembly, so as to save space for cooking purposes for a stovetop. For another example, for an induction cooktop, a single knob assembly may be configured to control both heating temperature and heating time, based on the configuration of the controlling unit (e.g., PCBA included in the controlling unit). In one possible example, when the knob assembly 100 is not pushed, the rotation of the knob assembly may control the heating temperature, and when the knob assembly is pushed and then rotated, the rotation of the knob assembly may control the cooking time instead, or vice versa. Other combinations of different control functions (e.g., combining cooking time with power level in a microwave, and so on) may be also possibly achieved through a single knob assembly.

In addition, in some embodiments, the knob assembly 100 may be configured to allow multiple clicks, depending on the configuration of the sensors 304 included in the coupled appliance. This then allows the control magnet 114 to control more functions of the coupled appliance. For example, one click may control the on/off of a coupled oven, while a double click may control the on/off of the light/fan for the coupled oven. In some embodiments, there may be a triple click to control additional function(s) of the coupled appliance, and the exact number of clicks configured for a coupled appliance is not limited in the present disclosure.

Figure 7:
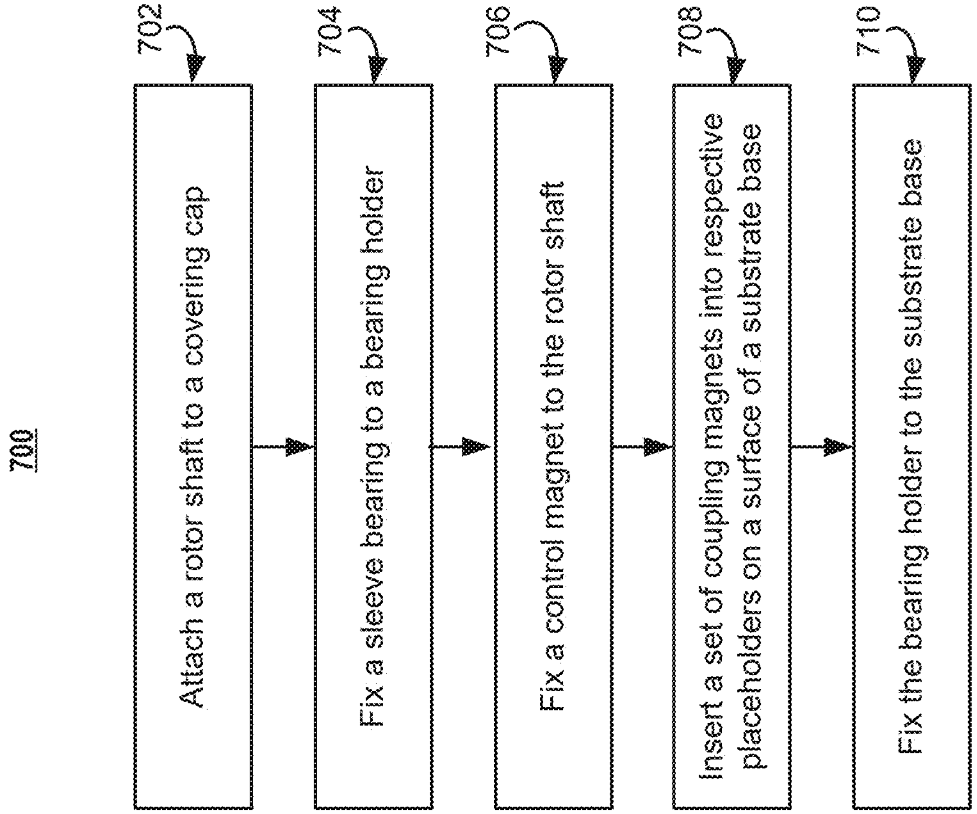
FIG. 7 is a flow chart illustrating an example process for preparing a magnetic control knob assembly, according to some embodiments of the disclosure.

Referring now to FIG. 7, a flow chart illustrating an example assembly process 700 for preparing the knob assembly is further described, according to some embodiments of the disclosure. The assembly process 700 ensures proper functionality, including smooth rotation and accurate detection of user actions like clicks. Here the following are the specific details for the assembly process 700.

Step 702 refers to a process of attaching the rotor shaft 112 to the covering cap 110. This includes attaching the rotor shaft 112 to the internal side of the covering cap 110 using screws 118. During the process, it should be checked to ensure that the rotor shaft 112 is securely fixed to prevent wobbling.

Step 704 refers to a process of fixing the sleeve bearing 106 to the bearing holder 104. This includes the insertion of the sleeve bearing 106 into the central hollow portion of the bearing holder 104. During the process, it should be checked to ensure that the sleeve bearing 106 is firmly placed into the central cavity of the bearing holder 104. It should also be checked that the bottom of the sleeve bearing 106 flushes with the internal surface (i.e., the bottom surface of the recess 308).

Step 706 refers to a process of fixing the control magnet 114. As can be seen from FIG. 3, the control magnet 114 may have a diameter greater than the inner cavity of the sleeve bearing 106. Accordingly, the control magnet 114 may be fastened to the bottom of the rotor shaft 112 from the bottom of the sleeve bearing 106. In other words, before attaching the bearing holder 104 to the substrate base 102, the control magnet 114 should be first fixed to the bottom of the rotor shaft 112. For example, the rotor shaft 112 may be inserted into the sleeve bearing 106 after the sleeve bearing 106 is fixed to the bearing holder 104, which then allows the control magnet 114 to be fastened to the lower part (e.g., part 122) of the rotor shaft 112 through the thread-forming screw 116, as shown in FIG. 3. During the process, it should be checked to ensure that the sleeve bearing 106 allows for smooth movement of the rotor shaft 112.

Step 708 refers to a process of preparing the static base. Specifically, the process includes the insertion of the coupling magnets 120 into their designated placeholders 202, ensuring alternating polarity (N/S alignment). This ensures the assembled knob aligns properly with appliance coupling magnets in the controlling unit of the coupled appliance. After the insertion of the coupling magnets 120, a small dab of grease is then applied to the bearing holder's top and bottom surfaces to reduce friction.

Step 710 refers to a process of fixing the bearing holder 104. This includes attaching the bearing holder 104 to the substrate base 102 using screws 120. The screws 120 may be inserted from the bottom of the substrate base 102. During the process, it should be checked to ensure that the control magnet 114 is able to move upward and downward and rotate inside the chamber formed by the bearing holder 104 and the substrate base 102. It should also be checked to ensure that the control magnet 114 aligns precisely with appliance sensors for accurate detection of rotation and clicks.

It should be noted that the above assembly process 700 is just one example process for assembling the knob assembly 100 disclosed herein. In some embodiments, depending on the specific fixing mechanisms, other different assembly processes may be used instead. For example, if the screws for fixing the bearing holder 104 to the substrate base 102 are inserted from the bearing holder side and the screws for fixing the rotor shaft 112 to the cap are inserted from the top surface of the cap, the assembly process may be different from the process 700 described above. In some embodiments, if no screw is used for fixing the bearing holder 104 to the substrate base 102 or fixing the rotor shaft 112 to the cap 110, the assembly process for the disclosed knob assembly may be also different. Accordingly, the present disclosure does not limit the specific process for preparing the disclosed knob assembly, as long as the assembled knob can achieve the expected rotation and click actions, and is also able to be detachably attached to the surface of the coupled appliance.

The above descriptions specify different components in the disclosed knob assembly 100, where these components can be combined as one component or operate in combination with each other, but the embodiments disclosed herein are not limited thereto. That is, unless it goes beyond a range of purposes of the present disclosure, the entire components may be selectively combined and operate as one or more components. Further, each of the entire components may be realized as independent hardware or some or all of the components may be selectively combined and realized as a computer program (e.g., the program included in a PCBA) having a program module that performs a part or all of the functions combined in one piece or a plurality of pieces of hardware.

In addition, certain codes and code segments constituting a computer program (e.g., program included in a PCBA) may be easily derived by those skilled in the art. The computer program may be stored in a non-transitory computer readable medium to be read and executed by a computing unit (e.g., a processor) thereby realizing the embodiments of the present disclosure. The non-transitory computer recordable medium refers to a machine-readable medium that stores data permanently or semi-permanently unlike a register, a cache, or a memory that stores data for a short time. Particularly, various applications and programs may be stored in and provided through the non-transitory computer recordable medium, such as a Compact Disc (CD), a Digital Versatile Disk (DVD), a hard disk, a Blu-ray disk, a Universal Serial Bus (USB), a memory card, a Read-Only Memory (ROM), or the like. In addition, the non-transitory computer recordable medium may be locally configured (e.g., inside a PCBA) and/or may be remotely located (e.g., at a cloud storage).

Computer programs may include code that filters the output of the sensor 304 to account for fluctuations in the magnetic field (e.g. due to the change in presence or orientation of adjacent knobs, change in magnetic flux of magnets in the system due to temperature changes, or external sources of magnetic flux). Computer programs may also include code that accounts for manufacturing or operating tolerances (e.g. variance in the magnetic flux of the various magnets in the system) in order to set thresholds for actuation. Computer programs may include code that takes calibration information from the manufacturing process or is derived from system performance over time.

The knob assembly and the coupled appliance disclosed herein may be combined with other systems, such as Near-Field Communications (NFC), Radio Frequency Identification (RFID), Bluetooth (BT) or similar hardware to uniquely identify the function of an attached knob or to unlock functions (e.g. a knob with a unique RFID chip may enable the operation of the oven, where the same knob without an RFID chip may prevent oven operation, even if the knobs are otherwise structurally identical). Unique information contained in the knob and queried through NFC, RFID, or BT systems may allow for storage of additional code that may allow for extended functionality (e.g. purchasing a knob from the manufacturer with unique code contained within and transmitted to the coupled appliance by way of BT may extend the functionality of the coupled appliance to add additional cooking modes or change the coupled appliance's UI to match the color the of the attached knob).

The knob assembly 100 may employ various methods for modifying the feel of the knob when turning or pressing, including springs, sprockets, detents, oil, grease, bumpers, and other features. It may be preferable to design systems with substantially similar designs which may or may not be visually indistinguishable from each other, but which have different tactile feel for a user (e.g. highly versus lightly damped or a various number of detents).

As above, a few embodiments have been shown and described. The foregoing embodiments and advantages are merely exemplary and are not to be construed as limiting the present inventive concept. The present disclosure may be readily applied to other types of devices. Also, the description of the embodiments is intended to be illustrative, and not to limit the scope, and many alternatives, modifications, and variations will be apparent to those skilled in the art.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expressions "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still cooperate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or component that includes a list of elements is not necessarily limited to only those elements but may include other elements not expressly listed or inherent to such process, method, article, or component. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present). In addition, "automatic" may involve fully automatic or semi-automatic embodiments involving user or operator control over certain aspects of the embodiment, depending on the desired embodiment of a person of ordinary skill in the art of practicing embodiments of the present disclosure.

In addition, the use of the "a" or "an" is employed to describe elements and components of the embodiments herein. This is done merely for convenience and to give a general sense of the claimed invention. This description should be read to include one or at least one and the singular also includes the plural unless it is obvious that it is meant otherwise.

Further, sequential terminology, such as "first", "second", "third", etc., may be used in the description and claims simply for labeling purposes and should not be limited to referring to described actions or items occurring in the described sequence. Actions or items may be ordered into a different sequence or may be performed in parallel or dynamically, without departing from the scope of the present disclosure.

Upon reading this disclosure, those of skill in the art will appreciate still additional alternative structural and functional designs for the system described above. Thus, while particular embodiments and applications have been illustrated and described, it is to be understood that the disclosed embodiments are not limited to the precise construction and components disclosed herein. Various modifications, changes, and variations, which will be apparent to those skilled in the art, may be made in the arrangement, operation, and details of the method and apparatus disclosed herein without departing from the spirit and scope defined in the appended claims.

What is claimed is:

1. A knob assembly for a coupled appliance, comprising a base static part and an actionable cap part, wherein:

the base static part includes a substrate base, a bearing holder fixed to the substrate base, a sleeve bearing fixed to the bearing holder, and a set of coupling magnets disposed between the bearing holder and the substrate base;

the actionable cap part includes a covering cap, a rotor shaft attached to the covering cap, and a control magnet fastened to the rotor shaft; and the knob assembly is capable of detachably attaching to a surface of the coupled appliance.

2. The knob assembly of claim 1, wherein the substrate base includes a set of placeholders for holding the set of coupling magnets.

3. The knob assembly of claim 2, wherein a placeholder of the set of placeholders includes a round recess for holding a coupling magnet of the set of coupling magnets.

4. The knob assembly of claim 1, wherein the substrate base further includes a first central recess for holding the control magnet.

5. The knob assembly of claim 4, wherein the first central recess includes an additional recess for holding a screw head of a screw for fastening the control magnet to the rotor shaft.

6. The knob assembly of claim 4, wherein the bearing holder includes a second central recess for holding the control magnet.

7. The knob assembly of claim 6, wherein the first central recess of the substrate base and the second central recess of the bearing holder together form a chamber for holding the control magnet.

8. The knob assembly of claim 7, wherein the chamber has a height greater than a height of the control magnet so that the control magnet is capable of moving upward and downward inside the chamber.

9. The knob assembly of claim 6, wherein a bottom edge of the sleeve bearing flushes with a surface of the second central recess after the sleeve bearing is fixed to the bearing holder.

10. The knob assembly of claim 1, wherein upper parts of adjacent coupling magnets have opposite polarity, and lower parts of adjacent coupling magnets have opposite polarity.

11. The knob assembly of claim 1, wherein the sleeve bearing includes a flange portion radially expanding at a top part of the sleeve bearing.

12. The knob assembly of claim 1, wherein the sleeve bearing is composed of a magnetic material.

13. The knob assembly of claim 1, wherein the rotor shaft includes a cap portion, a flange portion, and a pole extending from the cap portion.

14. The knob assembly of claim 13, wherein the flange portion includes a set of notches for holding screws for attaching the rotor shaft to the covering cap.

15. The knob assembly of claim 13, wherein the pole has a height greater than a height of the sleeve bearing.

16. The knob assembly of claim 15, wherein the pole includes a fixing hole at one end for receiving a screw for fixing the control magnet to the rotor shaft.

17. The knob assembly of claim 13, wherein the cap portion includes a central extended portion extending along one direction.

18. The knob assembly of claim 1, wherein a bottom edge of a sidewall of the covering cap has a distance from a bottom surface of the substrate base along an extension direction of the sidewall from a top of the covering cap towards the bottom edge.

19. An appliance coupled to a detachable knob assembly, comprising:

a set of coupling magnets; and one or more magnetic sensors disposed underneath a surface of the appliance, wherein:

upper parts of adjacent coupling magnets have opposite polarity, and lower parts of adjacent coupling magnets have opposite polarity, and the one or more magnetic sensors are configured to detect one or more of a rotation action or a click action of a control magnet disposed inside the detachable knob assembly.

20. A method of assembling a knob assembly, comprising:

attaching a rotor shaft to a covering cap;

fixing a sleeve bearing to a bearing holder;

fixing a control magnet to the rotor shaft, wherein the rotor shaft includes a pole inserted into an inner cavity of the sleeve bearing and a fixing hole for receiving a screw for fixing the control magnet to the rotor shaft;

inserting a set of coupling magnets into respective placeholders on a surface of a substrate base; and fixing the bearing holder to the substrate base.

* * * * *